(12) United States Patent
Takatori et al.

(10) Patent No.: US 7,193,999 B1
(45) Date of Patent: Mar. 20, 2007

(54) RECEPTION SYSTEM FOR REPLACING TRANSPORT PACKETS

(75) Inventors: Masahiro Takatori, Toyonaka (JP); Hidekazu Suzuki, Yamatokoriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1100 days.

(21) Appl. No.: 09/662,432

(22) Filed: Sep. 13, 2000

(30) Foreign Application Priority Data

Sep. 14, 1999 (JP) .................. 11-261075

(51) Int. Cl.
*H04L 12/28* (2006.01)
(52) U.S. Cl. ..................... 370/394; 370/474
(58) Field of Classification Search ............... 370/394, 370/474, 395, 244, 252, 392, 254–258, 351, 370/389
See application file for complete search history.

(56) References Cited

U.S. PATENT DOCUMENTS

| | | | |
|---|---|---|---|
| 5,600,378 A | | 2/1997 | Wasilewski |
| 5,835,493 A | * | 11/1998 | Magee et al. .......... 370/395.62 |
| 5,844,478 A | * | 12/1998 | Blatter et al. ............... 348/474 |
| 5,899,578 A | | 5/1999 | Yanagihara et al. |
| 5,917,830 A | * | 6/1999 | Chen et al. ................. 370/487 |
| 6,122,123 A | * | 9/2000 | Saeijs et al. ................... 360/51 |
| 6,185,228 B1 | | 2/2001 | Takashimizu et al. |
| 6,215,530 B1 | | 4/2001 | Wasilewski |
| 6,414,998 B1 | * | 7/2002 | Yoshinari et al. ...... 375/240.25 |
| 6,456,782 B1 | | 9/2002 | Kubota et al. |
| 6,601,237 B1 | | 7/2003 | Ten Kate et al. |

FOREIGN PATENT DOCUMENTS

| | | |
|---|---|---|
| EP | 0 805 598 A | 11/1997 |
| EP | 0 917 355 A | 5/1999 |
| EP | 0 930 781 A | 7/1999 |
| EP | 0 940 985 A | 9/1999 |
| JP | 2000-232627 | 8/2000 |

OTHER PUBLICATIONS

European Search Report for Application No. EP 00 11 9284, dated Nov. 12, 2004.

(Continued)

*Primary Examiner*—Dmitry Levitan
(74) *Attorney, Agent, or Firm*—RatnerPrestia

(57) ABSTRACT

A reception system has a receiving section which receives a transport stream transmitted from a transmission system that produces and transmits the transport stream, the transport stream being produced by multiplexing compression coded contents of a program, and electronic program guide information including program specific information having at least an NIT, a PAT, and a PMT, and service information having at least an SDT and an EIT;
a PID designating section which can designate a PID of a packet other than an NIT packet in the electronic program guide information, as a PID of a replace packet (hereinafter, referred to as replace PID);
a replace PID storing device which stores the replace PID;
an SIT producing section which produces an SIT packet from the service information in the received transport stream; and
a packet extracting and replacing section which can replace a replace packet indicated by said replace PID storing device, and the NIT packet with the SIT packet.

28 Claims, 10 Drawing Sheets

OTHER PUBLICATIONS

"Digital Video Broadcasting (DVB); Specification for Service Information (SI) in DVB Systems," EN 300 468 V1.3.1, Feb., 1998, pp. 1-74.

Kurioka, et al., "Television Home Server for Integrated Services—Toward the Realization of ISDB Anytime Services," IEEE Transactions on Consumer Electronics, IEEE Inc., New York, US, vol. 44, No. 4, Nov., 1998, pp. 1195-1199.

O. W. Bungum, "Transmultipleixng, Transcontrol and Transscrambling of MPEG-2/DVB Signal", International Broadcasting Convention, London, GB, Sep. 12, 1996, pp. 288-293.

Banks, et al., "Breaking Open the Set Top Box," Proceedings of the SPIE, SPIE, Bellingham, VA, US, vol. 3228, Nov. 4, 1997, pp. 105-116.

* cited by examiner

Fig. 1
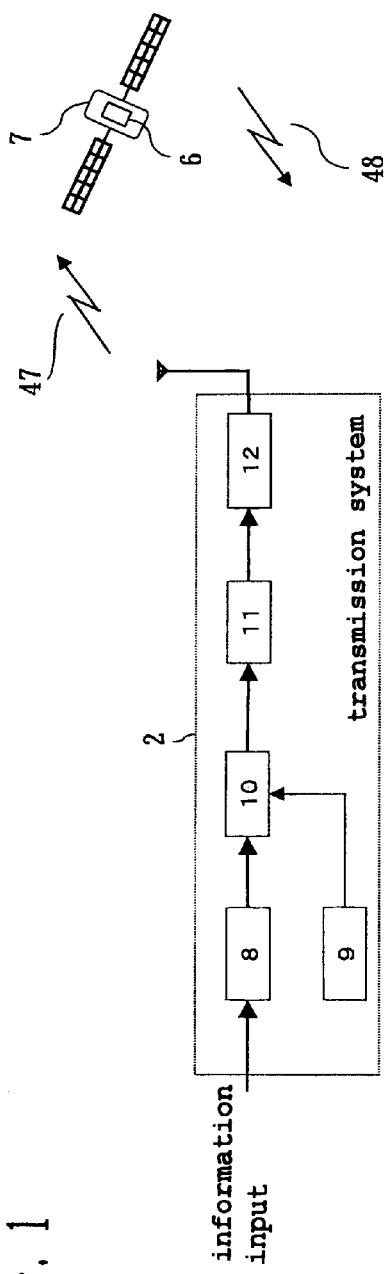
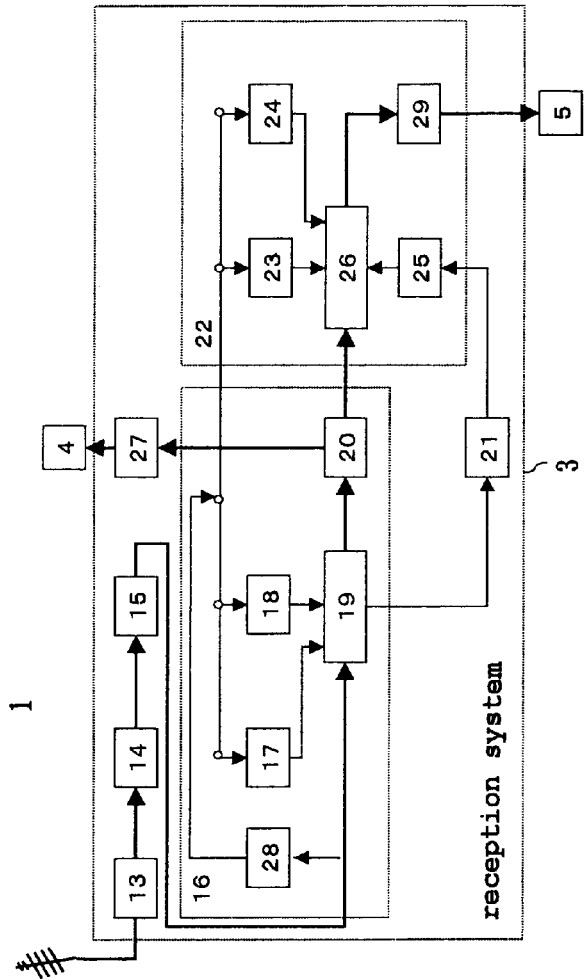

RECEPTION SYSTEM FOR REPLACING TRANSPORT PACKETS

BACKGROUND OF THE INVENTION

1. Field of the Invention

The present invention relates to a reception system and a digital broadcasting system.

2. Related Art of the Invention

As the development of digital video and audio technology using MPEG2, a digital multi-channel broadcasting based on a communication satellite has been already practically used. Referring to FIG. 9, the configuration of a digital broadcasting system of the conventional art will be described. FIG. 9 is a diagram showing the configuration of a digital broadcasting system 151 of the conventional art.

The digital broadcasting system 151 comprises a transmission system 102 which produces and transmits a transport stream, and a reception system 153 which receives the transport stream and outputs it to a display device 4 or a recording device 5. A satellite transponder 6 is a device which relays a radio wave, and mounted in a communication satellite 7.

Next, the configuration of the transmission system 102 of the conventional art will be described.

The transmission system 102 has a program selection relating data producing section 109, a packet multiplexing section 10, etc.

A coding section 8 has an MPEG2 video encoder which performs digital video compression coding, and an MPEG2 audio encoder which performs digital audio compression coding. Namely, the coding section 8 produces a packet stream consisting of packets having contents of a program, and outputs the packet stream to the packet multiplexing section 10.

The program selection relating data producing section 109 produces a packet stream consisting of a packet having program specific information (PSI), and a packet having service information (SI), and outputs the packet stream to the packet multiplexing section 10. The program specific information is configured by an NIT (Network Information Table), a PAT (Program Association Table), a PMT (Program Map Table), and the like, and the service information is configured by an SDT (Service Description Table), and EIT (Event Information Table), and the like. As described above, the program selection relating data producing section 109 produces a packet stream consisting of packets having contents of program selection relating data, and outputs the packet stream to the packet multiplexing section 10.

The packet multiplexing section 10 time division multiplexes the packet stream consisting of packets having contents of a program and supplied from the coding section 8, and that consisting of packets having contents of program selection relating data and supplied from the program selection relating data producing section 109, into one transport stream.

A channel coding section 11 performs addition of an error correcting code, an interleave process, and addition of a synchronizing signal (framing) on the transport stream supplied from the packet multiplexing section 10. The interleave process is performed by changing the order of data transmission in the order of byte, in order to enhance the error correcting ability. The addition of a synchronizing signal is performed so as to provide a synchronization byte with periodicity, thereby enabling synchronization in the reception system 153 to be easily attained.

A modulating section 12 applies a modulation process due to quadrature phase shift keying (QPSK) modulation or the like, on a signal supplied from the channel coding section 11. A radio wave 147 is a transmitted radio wave.

Next, the configuration of the reception system 153 of the conventional art will be described.

The reception system 153 has a packet demultiplexing section 166, a stream sending section 172, etc.

A receiving section 13 receives a radio wave 148 which is transmitted from the satellite transponder 6.

A demodulating section 14 has a detector circuit which demodulates the radio wave 148.

A channel decoding section 15 restores the transport stream in which the order of data transmission has been changed in the order of byte by the interleave process in the channel coding section 11, to the original transport stream, and performs error correction on the restored transport stream.

The packet demultiplexing section 166 has a packet identifier (PID) filter 169, etc. That is, a PID identifies a corresponding packet.

A PID designating section 178 can designate the PID of a packet having contents of a record program, to a record PID storing device 18. Also, the PID designating section 178 can designate an NIT PID (i.e., the PID of an NIT packet), to an NIT PID storing device 23. As described later, a record program is a program which is selected by external instructions.

The record PID storing device 18 receives a signal from the PID designating section 178, and stores the PID of a packet having contents of a record program.

The PID filter 169 extracts a packet having contents of a record program which is indicated by the record PID storing device 18, a packet having program specific information, and a packet having service information, from a transport stream which is output from the channel decoding section 15. However, the PID filter 169 has a function of allowing the packet having program specific information, and the packet having service information to pass therethrough without applying any process on the packets.

An output switching circuit 20 switches over the transport stream which is supplied from the PID filter 169, to an output for displaying or that for recording.

An SIT (Selection Information Table) producing section 21 produces an SIT packet from the service information which is output from the PID filter 169.

The stream sending section 172 has an SIT packet replacing device 176, etc.

The NIT PID storing device 23 receives a signal from the PID designating section 178, and stores the NIT PID. As described later, an NIT packet is used as a replace packet which is replaceable with an SIT packet.

An SIT storing device 25 stores the SIT packet which is produced by the SIT producing section 21.

The SIT packet replacing device 176 can replace an NIT packet which is indicated by the NIT PID storing device 23, with the SIT packet which is output from the SIT storing device 25.

A packet modifying section 29 can receive a signal which is output from the SIT packet replacing device 176, and modify a packet to produce a record transport stream. The produced transport stream is output to the recording device 5.

A decoding section 27 has an MPEG2 video decoder which expands a compression coded video signal supplied from the output switching circuit 20, and an MPEG2 audio decoder which expands a compression coded audio signal supplied from the output switching circuit 20. Namely, the decoding section 27 expands a display transport stream which has compression coded contents of a program, and outputs the expanded stream to the display device 4. A display transport stream consists of transport packets containing video and audio contents.

The display device 4 has a cathode ray tube which reproduces a video signal supplied from the decoding section 27, and a loudspeaker which reproduces an audio signal supplied from the decoding section 27.

The recording device 5 records a record transport stream which is output from the SIT packet replacing device 176.

The operation of the thus configured digital broadcasting system 51 of the conventional art will be described with reference to FIG. 10 also. FIG. 10 is a conceptual diagram illustrating steps of producing a record transport stream 196 from a transport stream 144 which is broadcast.

Hereinafter, the operation of the transmission system 102 of the conventional art will be described in detail.

The coding section 8 produces a packet stream consisting of packets 130 and 138 having contents of a program A, and a packet stream consisting of packets 131, 135, and 139 having contents of a program B, and outputs the packet streams to the packet multiplexing section 10.

The program selection relating data producing section 109 produces a packet stream consisting of a PAT packet 132, a PMT packet 137, an NIT packet 134, an SDT packet 136, and an EIT packet 133, and outputs the packet stream to the packet multiplexing section 10.

The packet multiplexing section 10 multiplexes the packet stream supplied from the coding section 8, and the packet stream supplied from the program selection relating data producing section 109, to produce the transport stream 144. The transport stream 144 is then output to the channel coding section 11.

The channel coding section 11 performs addition of an error correcting code, an interleave process, and addition of a synchronizing signal on the transport stream supplied from the packet multiplexing section 10, and then outputs the transport stream to the modulating section 12.

The modulating section 12 applies a modulation process due to quadrature phase shift keying modulation, on the transport stream supplied from the channel coding section 11, and transmits the radio wave 147 from an antenna.

The satellite transponder 6 receives the radio wave 147, and then transmits the radio wave 148.

Next, the operation of the reception system 153 of the conventional art will be described in detail.

In response to external instructions, the reception system 153 selects the program A as a record program to start the receiving operation. Specifically, the reception system 153 receives the radio wave 148 from the satellite transponder 6, and refers information in the PAT in the transport stream of the radio wave, to detect the PMT. The PMT has the PIDs of packets for transferring a stream relating to the program A. The PID designating section 178 recognizes the PIDs of the packets 130 and 138 having contents of the record program, and performs a signal output to the record PID storing device 18. The PID designating section 178 recognizes the PID of the NIT packet 134, and performs also a signal output to the NIT PID storing device 23.

The record PID storing device 18 receives the signal from the PID designating section 178, and stores the PIDs of the packets 130 and 138 having contents of the program A. The NIT PID storing device 23 receives the signal from the PID designating section 178, and stores the PID of the NIT packet 134.

The receiving section 13 receives the radio wave 148, and then outputs the radio wave to the demodulating section 14.

The demodulating section 14 outputs the transport stream which is obtained by demodulating the radio wave 148 received by the receiving section 13, to the channel decoding section 15.

The channel decoding section 15 performs error correction on the transport stream supplied from the demodulating section 14, restores the transport stream 144, and outputs the restored transport stream to the PID filter 169.

As described above, the record PID storing device 18 stores the PIDs of the packets 130 and 138 having contents of the program A. Therefore, the record PID storing device 18 can indicate the packets 130 and 138 having contents of the program A, to the PID filter 169.

The PID filter 169 extracts the packets 130 and 138 having contents of the program A which are indicated by the record PID storing device 18, from the transport stream 144 output from the channel decoding section 15. Furthermore, the PID filter 169 extracts the PAT packet 132, the PMT packet 137, the NIT packet 134, the SDT packet 136, and the EIT packet 133 from the transport stream 144 output from the channel decoding section 15.

The PID filter 169 then outputs the SDT and the EIT to the SIT producing section 21. Furthermore, the PID filter 169 outputs to the output switching circuit 20 a transport stream 195 consisting of the packets 130 and 138 having contents of the program A, the PAT packet 132, the PMT packet 137, the NIT packet 134, the SDT packet 136, and the EIT packet 133.

The SIT producing section 21 comprehends the SDT and the EIT supplied from the PID filter 169, produces SIT packets 141 and 142 from required service information, and outputs the SIT packets to the SIT storing device 25. The SIT storing device 25 outputs the SIT packets 141 and 142 supplied from the SIT producing section 21, to the SIT packet replacing device 176.

The output switching circuit 20 receives the transport stream 195 supplied from the PID filter 169.

If the output switching circuit 20 is set to the output for displaying, the output switching circuit 20 outputs the display transport stream to the decoding section 27. The display transport stream consists of the packets 130 and 138 having contents of the program A which have been filtered with reference to information in the PMT.

The decoding section 27 expands the display transport stream supplied from the output switching circuit 20, and outputs a signal of the expanded stream to the display device 4.

The display device 4 receives the signal output from the decoding section 27, and reproduces an image and a sound constituting the program A.

If the output switching circuit 20 is set to the output for recording, the output switching circuit 20 outputs the transport stream 195 to the SIT packet replacing device 176.

As described above, the NIT PID storing device 23 stores the PID of the NIT packet 134. Therefore, the NIT PID storing device 23 can indicate the NIT packet 134 to the SIT packet replacing device 176.

The SIT packet replacing device 176 receives the transport stream 195 supplied from the output switching circuit 20. The SIT packet replacing device 176 replaces the NIT packet 134 indicated by the NIT PID storing device 23, with the SIT packet 141 supplied from the SIT storing device 25.

In this way, the SIT packet replacing device 176 performs replacement of the NIT packet 134 with the SIT packet 141, and then outputs the signal to the packet modifying section 29.

The packet modifying section 29 receives the signal output from the SIT packet replacing device 176, and selects only specific information which correctly indicates the transport stream 195, whereby the PAT packet 132 is modified to a modified PAT packet 140, and the PMT packet 137 is modified to a modified PAT packet 143. The packet modifying section 29 discards the SDT packet 136 and the EIT packet 133.

In this way, the packet modifying section 29 produces a record transport stream 196, and outputs the stream to the recording device 5.

The recording device 5 receives the record transport stream 196 supplied from the packet modifying section 29, and records the transport stream.

In some cases, the transmission interval of an NIT packet is only about one time per 10 seconds depending on a broadcasting medium. This transmission interval is insufficient as the transmission interval for a replace packet which is replaceable with an SIT packet.

In the above, an NIT packet which is replaceable with the SIT packet 142 does not exist in the transport stream 195. Therefore, it is impossible to introduce the SIT packet 142 into the record transport stream 196. As a result, the SIT packet 142 is discarded.

SUMMARY OF THE INVENTION

The invention has been conducted in view of the problem. It is an object of the invention to provide a digital broadcasting system characterized in that a replace packet which is replaceable with an SIT packet can be certainly ensured.

One aspect of the present invention is a reception system comprising:
  a receiving section which receives a transport stream transmitted from a transmission system that produces and transmits the transport stream, the transport stream being produced by multiplexing compression coded contents of a program, and electronic program guide information including program specific information having at least an NIT, a PAT, and a PMT, and service information having at least an SDT and an EIT;
  a PID designating section which can designate a PID of a packet other than an NIT packet in the electronic program guide information, as a PID of a replace packet (hereinafter, referred to as replace PID);
  a replace PID storing device which stores the replace PID;
  an SIT producing section which produces an SIT packet from the service information in the received transport stream; and
  a packet extracting and replacing section which can replace a replace packet indicated by said replace PID storing device, and the NIT packet with the SIT packet.

Another aspect of the present invention is a reception system, wherein said transmission system produces a dummy packet for replacement, and inserts the dummy packet into the transport stream, and
  said PID designating section designates a PID of the dummy packet (hereinafter, referred to as dummy PID) as the replace PID.

Still another aspect of the present invention is a reception system, wherein said transmission system produces interval information of the SIT packet, and transmits the interval information of the SIT packet with adding the interval information to the electronic program guide information, and
  said PID designating section designates the replace PID with reference to the interval information of the SIT packet.

Yet another aspect of the present invention is a reception system, wherein the designated replace PID is a PID of a packet having contents of an unrecord program (hereinafter, referred to as unrecord PID), or an EIT PID or an SDT PID,
  said packet extracting and replacing section includes a PID filter and an SIT packet replacing device, and said PID filter can extract a packet having the designated replace PID and contents of an unrecord program.

Still yet another aspect of the present invention is a reception system, wherein said PID designating section designates a PID of a packet having contents of an unrecord program (hereinafter, referred to as unrecord PID), or an EIT PID or an SDT PID, and
  said packet extracting and replacing section selects the replace packet from packets having the designated replace PID with reference to given interval information of the SIT packet, and actually replaces the selected packet with the SIT packet.

Another aspect of the present invention is a digital broadcasting system comprising:
  a transmission system which produces and transmits a transport stream, the transport stream being produced by multiplexing compression coded contents of a program, and electronic program guide information including program specific information having at least an NIT, a PAT, and a PMT, and service information having at least an SDT and an EIT; and
  a reception system having: a receiving section which receives the transport stream transmitted from said transmission system; a PID designating section which can designate a PID of a packet other than an NIT packet in the electronic program guide information, as a PID of a replace packet (hereinafter, referred to as replace PID); a replace PID storing device which stores the replace PID; an SIT producing section which produces an SIT packet from the service information in the received transport stream; and a packet extracting and replacing section which can replace a replace packet indicated by said replace PID storing device, and the NIT packet with the SIT packet.

A still further aspect of the present invention is a program recording medium which stores a program for causing a computer to execute a whole or a part of the functions of the present invention.

BRIEF DESCRIPTION OF THE DRAWINGS

FIG. 1 is a diagram showing the configuration of a digital broadcasting system which is described in Embodiment 1 of the invention.

DESCRIPTION OF THE REFERENCE NUMERALS AND SIGNS

Figure 2:
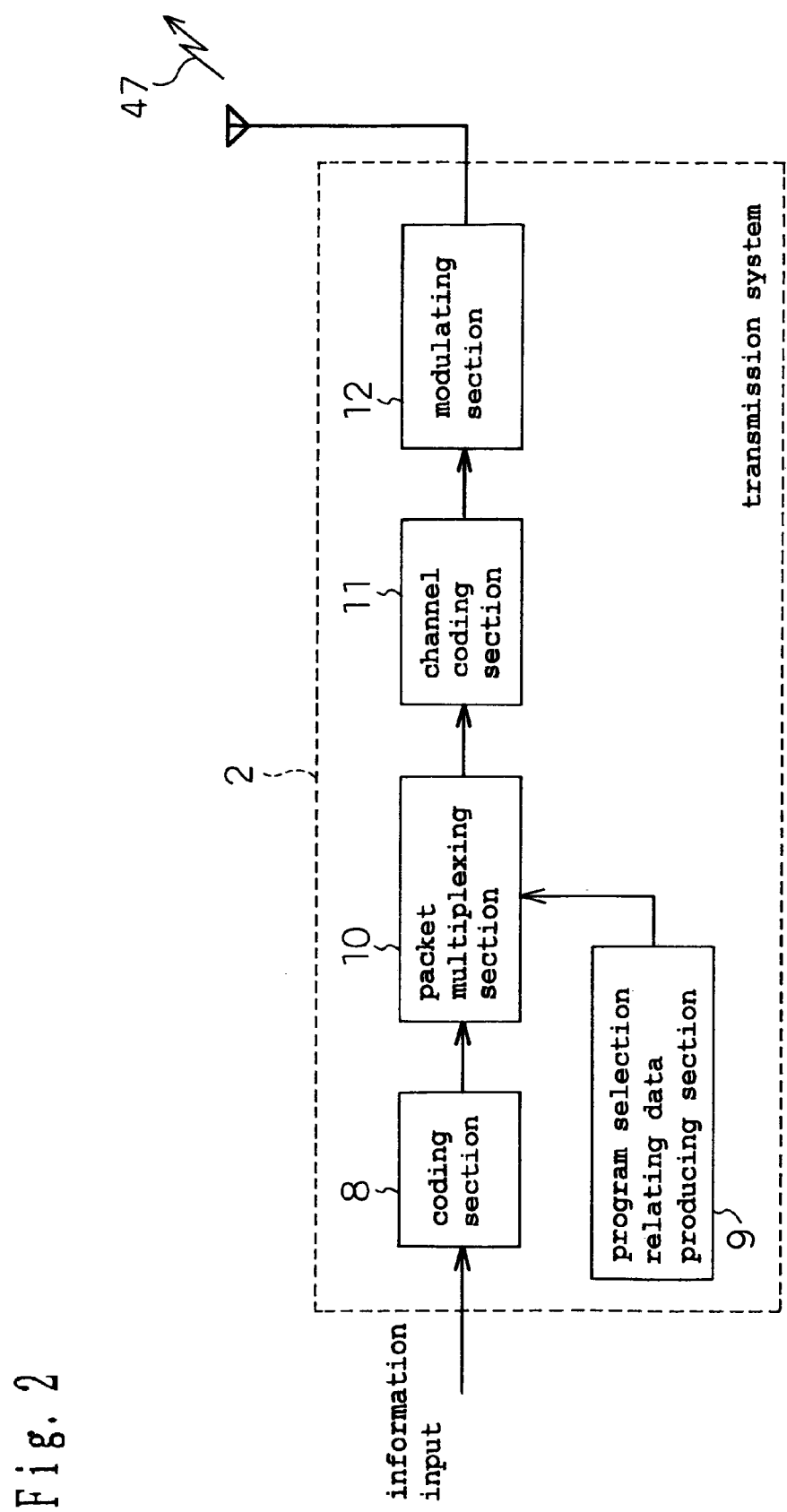
FIG. 2 is a diagram showing the configuration of a transmission system which is described in Embodiment 1 of the invention.

1 digital broadcasting system
2 transmission system
3 reception system
4 display device
5 recording device
6 satellite transponder
7 communication satellite
8 coding section
9 program selection relating data producing section
10 packet multiplexing section
11 channel coding section
12 modulating section
13 receiving section
14 demodulating section
15 channel decoding section
16 packet demultiplexing section
17 first replace PID storing device
18 record PID storing device
19 PID filter
20 output switching circuit
21 SIT producing section
22 stream sending section
23 NIT PID storing device
24 second replace PID storing device
25 SIT storing device
26 SIT packet replacing device
27 decoding section
28 PID designating section
29 packet modifying section
51 digital broadcasting system
52 transmission system
53 reception system
59 program selection relating data producing section
66 packet demultiplexing section
67 first replace PID storing device
69 PID filter
72 stream sending section
74 second replace PID storing device
76 SIT packet replacing device
78 PID designating section
101 digital broadcasting system
102 transmission system
103 reception system
109 program selection relating data producing section
116 packet demultiplexing section
117 first replace PID storing device
119 PID filter
122 stream sending section
124 second replace PID storing device
126 SIT packet replacing device
128 PID designating section
129 packet modifying section
151 digital broadcasting system
153 reception system
166 packet demultiplexing section
169 PID filter
172 stream sending section
176 SIT packet replacing device

DESCRIPTION OF THE PREFERRED EMBODIMENTS

Hereinafter, embodiments of the invention will be described with reference to the accompanying drawings.

Embodiment 1

First, the configuration of a digital broadcasting system of Embodiment 1 will be described with reference to FIG. 1. FIG. 1 is a diagram showing the configuration of a digital broadcasting system 1 of Embodiment 1.

The digital broadcasting system 1 comprises a transmission system 2 which produces and transmits a transport stream, and a reception system 3 which receives the transport stream and outputs it to a display device 4 or a recording device 5. A satellite transponder 6 is a device which relays a radio wave, and mounted in a communication satellite 7.

Next, the configuration of the transmission system 2 in Embodiment 1 will be described with reference to FIG. 2. FIG. 2 is a diagram showing the configuration of the transmission system 2 in Embodiment 1.

The transmission system 2 has a program selection relating data producing section 9, a packet multiplexing section 10, etc.

A coding section 8 has an MPEG2 video encoder which performs digital video compression coding, and an MPEG2 audio encoder which performs digital audio compression coding. Namely, the coding section 8 produces a packet stream consisting of packets having contents of a program, and outputs the packet stream to the packet multiplexing section 10.

The program selection relating data producing section 9 produces a packet stream consisting of a packet having program specific information, a packet having service information, and program dummy packets, and outputs the packet stream to the packet multiplexing section 10. Furthermore, also a packet having data for previously notifying the program dummy packets to the reception system 3 is produced by the program selection relating data producing section 9, and then output to the packet multiplexing section 10. Also the PIDs of the program dummy packets are designated by a PMT in the same manner as the PIDs of data constituting a program. In this way, the program selection relating data producing section 9 produces a packet stream consisting of packets having contents of program selection relating data, and outputs the packet stream to the packet multiplexing section 10.

The packet multiplexing section 10 time division multiplexes the packet stream consisting of packets having contents of a program and supplied from the coding section 8, and that consisting of packets having contents of program selection relating data and supplied from the program selection relating data producing section 9, into one transport stream.

A channel coding section 11 adds an error correcting code to the transport stream supplied from the packet multiplexing section 10, and performs an interleave process, and addition of a synchronizing signal.

A modulating section 12 modulates the transport stream supplied from the channel coding section 11, and transmits a radio wave 47 from an antenna.

Figure 3:
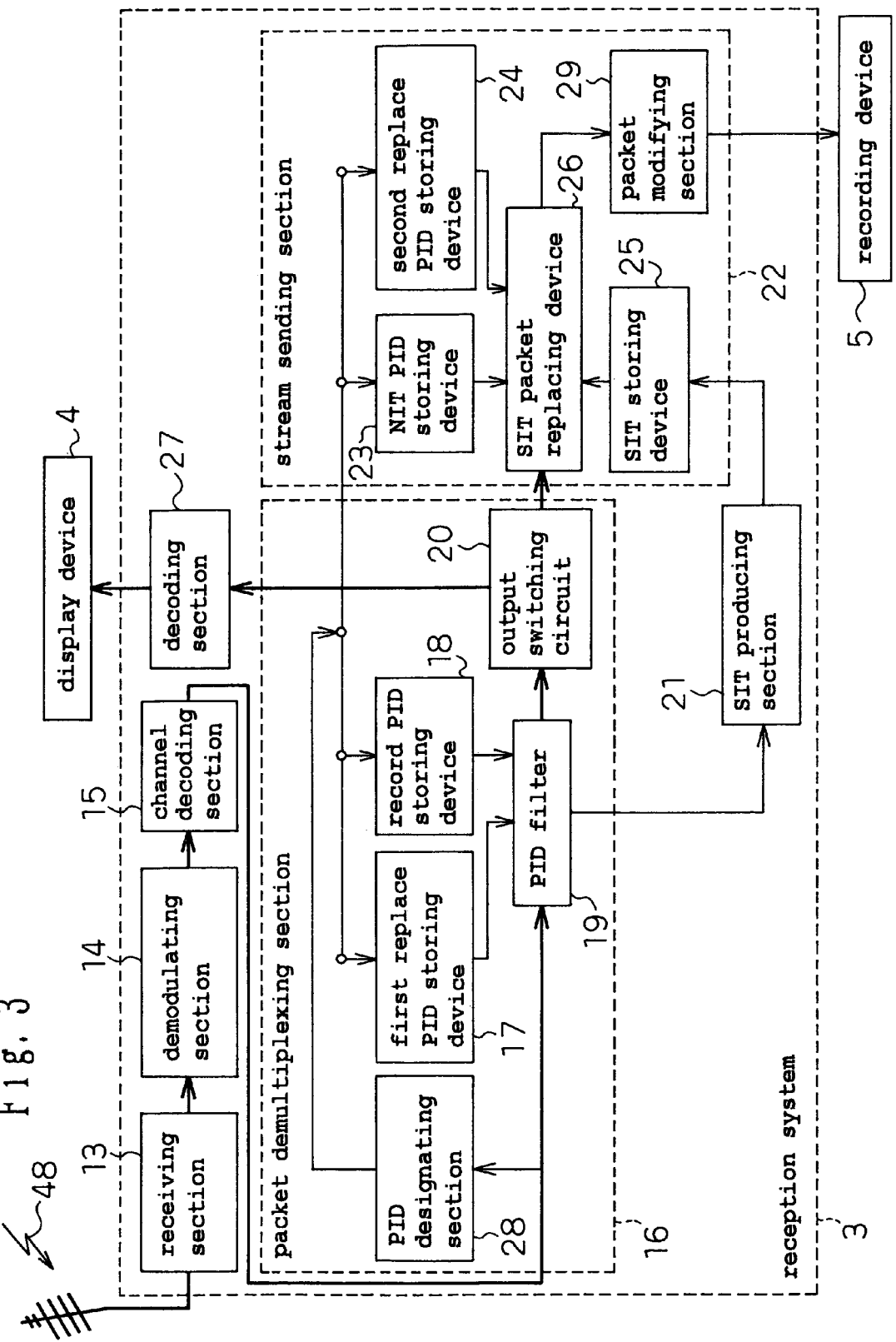
FIG. 3 is a diagram showing the configuration of a reception system which is described in Embodiment 1 of the invention.

Next, the configuration of the reception system 3 in Embodiment 1 will be described in detail with reference to FIG. 3. FIG. 3 is a diagram showing the configuration of the reception system 3 in Embodiment 1.

The reception system 3 has a packet demultiplexing section 16, a stream sending section 22, etc.

A receiving section 13 receives a radio wave 48 which is transmitted from the satellite transponder 6 (shown in FIG. 1) A demodulating section 14 has a detector circuit which demodulates the radio wave 48.

A channel decoding section 15 restores the transport stream which has undergone the interleave process in the channel coding section 11, to the original transport stream, and performs error correction on the restored transport stream.

The packet demultiplexing section 16 has a PID filter 19, etc.

A PID designating section 28 can designate the PID of a dummy packet for a record program (hereinafter, often referred to as record program dummy PID), to a first replace PID storing device 17 and a second replace PID storing device 24. As described later, a record program is a program which is selected by external instructions.

The first replace PID storing device 17 receives a signal from the PID designating section 28, and stores the record program dummy PID. The record program dummy PID stored in the first replace PID storing device 17 is identical with the record program dummy PID stored in the second replace PID storing device 24.

The record PID storing device 18 receives a signal from the PID designating section 28, and stores the PID of a packet having contents of a record program.

The PID filter 19 extracts a packet having contents of a record program which is indicated by the record PID storing device 18, a record program dummy packet which is indicated by the first replace PID storing device 17, a packet having program specific information, and a packet having service information, froma transport streamwhich is supplied from the channel decoding section 15. However, the PID filter 19 has a function of allowing the packet having program specific information, and the packet having service information to pass therethrough without applying any process on the packets.

An output switching circuit 20 switches over the transport stream which is supplied from the PID filter 19, to an output for displaying or that for recording.

An SIT producing section 21 produces an SIT packet from the SDT or the EIT which is output from the PID filter 19.

The stream sending section 22 has an SIT packet replacing device 26, etc.

An NIT PID storing device 23 receives a signal from the PID designating section 28, and stores the NIT PID.

The second replace PID storing device 24 receives a signal from the PID designating section 28, and stores the record program dummy PID. The record program dummy PID stored in the second replace PID storing device 24 is identical with the record program dummy PID stored in the first replace PID storing device 17.

An SIT storing device 25 stores the SIT packet which is produced by the SIT producing section 21.

The SIT packet replacing device 26 can replace an NIT packet which is indicated by the NIT PID storing device 23, and the record program dummy packet indicated by the second replace PID storing device 24, with the SIT packet which is output from the SIT storing device 25.

A packet modifying section 29 can receive a signal which is output from the SIT packet replacing device 26, and modify a packet to produce a record transport stream. The produced transport stream is output to the recording device 5.

A decoding section 27 has an MPEG2 video decoder which expands a compression coded video signal supplied from the output switching circuit 20, and an MPEG2 audio decoder which expands a compression coded audio signal supplied from the output switching circuit 20. Namely, the decoding section 27 expands a display transport stream which has compression coded contents of a program, and outputs the expanded stream to the display device 4.

Figure 4:
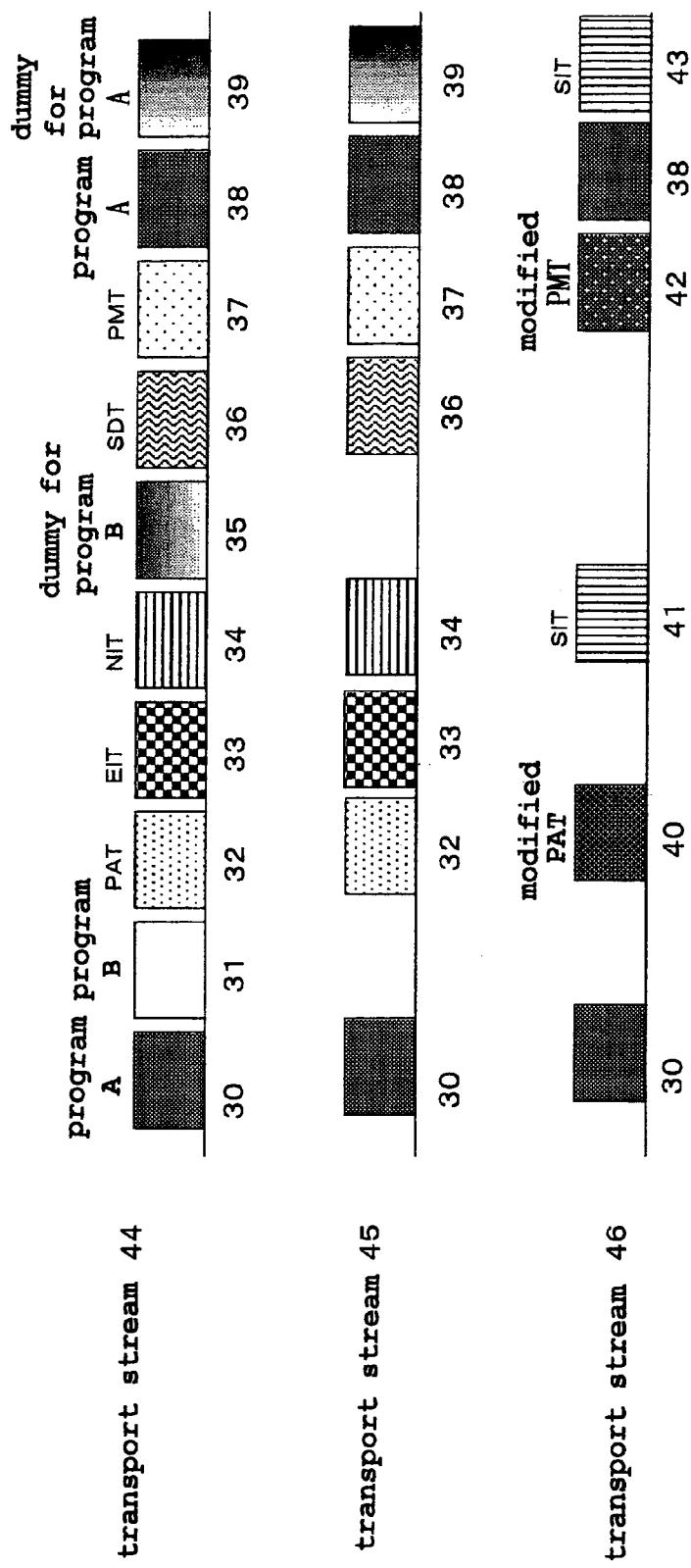
FIG. 4 is a conceptual diagram illustrating steps of producing a record transport stream which is described in Embodiment 1 of the invention.

The operation of the thus configured digital broadcasting system 1 of Embodiment 1 will be described with reference to FIG. 4 also. FIG. 4 is a conceptual diagram illustrating steps of producing a record transport stream 46 from a transport stream 44 which is broadcast, via a transport stream 45 which is processed in the packet demultiplexing section 16.

Hereinafter, the operation of the transmission system 2 in Embodiment 1 will be described in detail with reference to FIGS. 2 and 4.

The coding section 8 produces a packet stream consisting of packets 30 and 38 having contents of a program A, and a packet stream consisting of a packet 31 having contents of a program B, and outputs the packet streams to the packet multiplexing section 10.

The program selection relating data producing section 9 produces a packet stream consisting of a PAT packet 32, a PMT packet 37, an NIT packet 34, an SDT packet 36, an EIT packet 33, a dummy packet 39 for the program A, and a dummy packet 35 for the program B, and outputs the packet stream to the packet multiplexing section 10.

The packet multiplexing section 10 multiplexes the packet stream supplied from the coding section 8, and the packet stream supplied from the program selection relating data producing section 9, to produce the transport stream 44. The transport stream is then output to the channel coding section 11.

The channel coding section 11 performs addition of an error correcting code, an interleave process, and addition of a synchronizing signal on the transport stream 44 supplied from the packet multiplexing section 10, and then outputs the transport stream to the modulating section 12.

The modulating section 12 applies a modulation process due to quadrature phase shift keying modulation, on the transport stream supplied from the channel coding section 11, and transmits the radio wave 47 from the antenna.

The satellite transponder 6 (shown in FIG. 1) receives the radio wave 47 (shown in FIG. 1), and then transmits the radio wave 48 (shown in FIG. 1).

Next, the operation of the reception system 3 in Embodiment 1 will be described in detail with reference to FIGS. 3 and 4.

In response to external instructions, the reception system 3 selects the program A as a record program in Embodiment 1 to start the receiving operation. Specifically, the reception system 3 receives the radio wave 48 from the satellite transponder 6, and refers information in the PAT in the transport stream of the radio wave, to detect the PMT. The PID designating section 28 recognizes the PID of the record program dummy packet 39, and performs a signal output to the first replace PID storing device 17 and the second replace PID storing device 24. The PID designating section 28 performs also a signal output to the record PID storing device 18 and the NIT PID storing device 23.

The record PID storing device 18 receives the signal from the PID designating section 28, and stores the PIDs of the packets 30 and 38 having contents of the program A. The first replace PID storing device 17 receives the signal from the PID designating section 28, and stores the PID of the dummy packet 39 for the program A. The NIT PID storing device 23 receives the signal from the PID designating section 28, and stores the PID of the NIT packet 34. The second replace PID storing device 24 receives the signal from the PID designating section 28, and stores the PID of the dummy packet 39 for the program A.

The receiving section 13 receives the radio wave 48, and then outputs the radio wave to the demodulating section 14.

The demodulating section 14 outputs the transport stream which is obtained by demodulating the radio wave 48 received by the receiving section 13, to the channel decoding section 15.

The channel decoding section 15 performs error correction on the transport stream supplied from the demodulating section 14, restores the transport stream 44, and outputs the restored transport stream to the PID filter 19.

As described above, the record PID storing device 18 stores the PIDs of the packets 30 and 38 having contents of the program A. The first replace PID storing device 17 stores the PID of the dummy packet 39 for the program A, as a replace PID.

Therefore, the record PID storing device 18 can indicate the packets 30 and 38 having contents of the program A, to the PID filter 19. The first replace PID storing device 17 can indicate the dummy packet 39 for the program A, to the PID filter 19.

The PID filter 19 extracts the packets 30 and 38 having contents of the program A which are indicated by the record PID storing device 18, and the dummy packet 39 for the program A which is indicated by the first replace PID storing device 67, from the transport stream 44 output from the channel decoding section 15. Furthermore, the PID filter 19 extracts the PAT packet 32, the PMT packet 37, the NIT packet 34, the SDT packet 36, and the EIT packet 33 from the transport stream 44 output from the channel decoding section 15.

The PID filter 19 then outputs the SDT and the EIT to the SIT producing section 21. Furthermore, the PID filter 19 outputs to the output switching circuit 20 the transport stream 45 consisting of the packets 30 and 38 having contents of the program A, the dummy packet 39 for the program A, the PAT packet 32, the PMT packet 37, the NIT packet 34, the SDT packet 36, and the EIT packet 33.

The SIT producing section 21 receives the SDT and the EIT supplied from the PID filter 19, produces SIT packets 41 and 43, and outputs the SIT packets to the SIT storing device 25. The SIT storing device 25 outputs the SIT packets 41 and 43 supplied from the SIT producing section 21, to the SIT packet replacing device 26.

The output switching circuit 20 receives the transport stream 45 supplied from the PID filter 19.

If the output switching circuit 20 is set to the output for displaying, the output switching circuit 20 outputs the display transport stream to the decoding section 27.

The decoding section 27 expands the display transport stream supplied from the output switching circuit 20, and outputs a signal of the expanded stream to the display device 4.

The display device 4 receives the signal output from the decoding section 27, and displays an image and a sound constituting the program A.

If the output switching circuit 20 is set to the output for recording, the output switching circuit 20 outputs the transport stream 45 to the SIT packet replacing device 26.

As described above, the NIT PID storing device 23 stores the PID of the NIT packet 34, and the second replace PID storing device 24 stores the PID of the dummy packet 39 for the program A.

Therefore, the NIT PID storing device 23 can indicate the NIT packet 34 to the SIT packet replacing device 26. The second replace PID storing device 24 can indicate the dummy packet 39 for the program A to the SIT packet replacing device 26.

The SIT packet replacing device 26 receives the transport stream 45 supplied from the output switching circuit 20. The SIT packet replacing device 26 replaces the NIT packet 34 indicated by the NIT PID storing device 23, with the SIT packet 41 supplied from the SIT storing device 25. The SIT packet replacing device 26 replaces the dummy packet 39 for the program A indicated by the second replace PID storing device 24, with the SIT packet 43 supplied from the SIT storing device 25.

In this way, the SIT packet replacing device 26 performs replacement of the NIT packet 34 with the SIT packet 41, and that of the dummy packet 39 for the program A with the SIT packet 43, and then outputs the signals to the packet modifying section 29.

The packet modifying section 29 receives the signals output from the SIT packet replacing device 26, and selects only specific information which correctly indicates the transport stream 45, whereby the PAT packet 32 is modified to a modified PAT packet 40, and the PMT packet 37 is modified to a modified PAT packet 42. The packet modifying section 29 discards the SDT packet 36 and the EIT packet 33. In this way, the packet modifying section 29 produces a record transport stream 46, and outputs the stream to the recording device 5.

The recording device 5 receives the record transport stream 46 supplied from the packet modifying section 29, and records the transport stream.

In the invention, the PIDs of program dummy packets are not required to be designated by the PMT as in Embodiment 1 described above, and may be described as descriptors in a descriptor region of the SDT or the EIT.

As described above, the problem in that the transmission interval of an NIT packet as a replace packet is insufficient is solved by sending program dummy packets which are replaceable with an SIT packet, from the transmission system.

Embodiment 2

Figure 5:
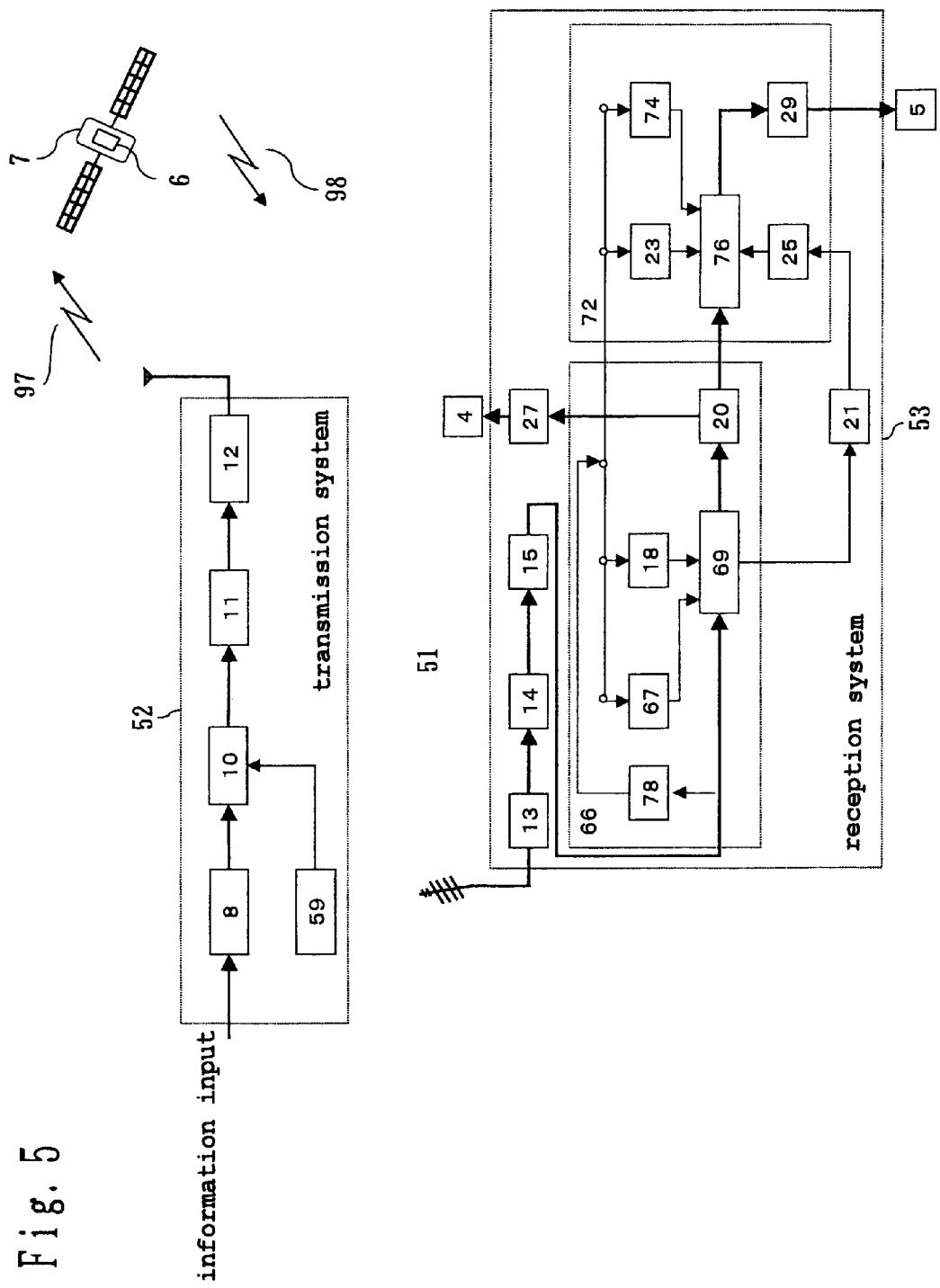
FIG. 5 is a diagram showing the configuration of a digital broadcasting system which is described in Embodiment 2 of the invention.

First, the configuration of a digital broadcasting system of Embodiment 2 will be described with reference to FIG. 5. FIG. 5 is a diagram showing the configuration of a digital broadcasting system 51 of Embodiment 2.

The digital broadcasting system 51 comprises a transmission system 52 which produces and transmits a transport stream, and a reception system 53 which receives the transport stream and outputs it to a display device 4 or a recording device 5.

Next, the configuration of the transmission system 52 in Embodiment 2 will be described.

The transmission system 52 has a program selection relating data producing section 59, a packet multiplexing section 10, etc.

The program selection relating data producing section 59 produces a packet stream consisting of a packet having program specific information, and a packet having service information, and outputs the packet stream to the packet multiplexing section 10. Furthermore, also a packet having an SIT record interval data instructing an appropriate record interval for the SIT is produced by the program selection relating data producing section 59, and then output to the packet multiplexing section 10. The SIT record interval data instructing an appropriate record interval for the SIT is described as a descriptor in a descriptor region of the SDT or the EIT.

Next, the configuration of the reception system 53 in Embodiment 2 will be described.

The reception system 53 has a packet demultiplexing section 66, a stream sending section 72, etc.

The packet demultiplexing section 66 has a PID filter 69, etc.

A PID designating section 78 can designate the PID of a packet having contents of an unrecord program (hereinafter, often referred to as unrecord PID), to a first replace PID storing device 67 and a second replace PID storing device 74, with reference to the SIT record interval data which is output from the program selection relating data producing section 59.

The first replace PID storing device 67 receives a signal from the PID designating section 78, and stores the unrecord PID. The unrecord PID stored in the first replace PID storing device 67 is identical with the unrecord PID stored in the second replace PID storing device 74.

The PID filter 69 extracts a packet having contents of a record program which is indicated by a record PID storing device 18, a packet having contents of the unrecord program which is indicated by the first replace PID storing device 67, a packet having program specific information, and a packet having service information, from a transport stream which is supplied from a channel decoding section 15.

The stream sending section 72 has an SIT packet replacing device 76, etc.

The second replace PID storing device 74 receives a signal from the PID designating section 78, and stores the unrecord PID. The unrecord PID stored in the second replace PID storing device 74 is identical with the unrecord PID stored in the first replace PID storing device 67.

The SIT packet replacing device 76 can replace an NIT packet which is indicated by an NIT PID storing device 23, and the packet having contents of the unrecord program indicated by the second replace PID storing device 74, with the SIT packet which is output from an SIT storing device 25.

Figure 6:
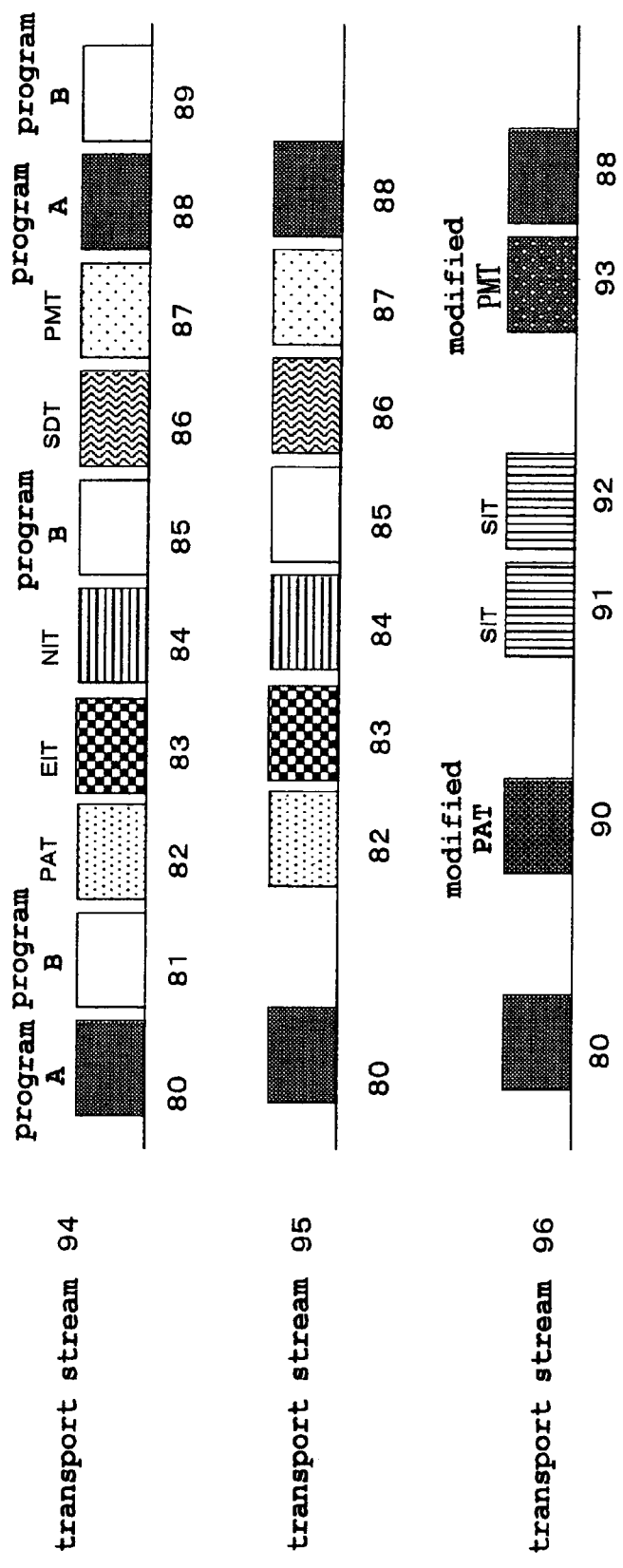
FIG. 6 is a conceptual diagram illustrating steps of producing a record transport stream which is described in Embodiment 2 of the invention.

The operation of the thus configured digital broadcasting system 51 of Embodiment 2 will be described with reference to FIG. 6 also. FIG. 6 is a conceptual diagram illustrating steps of producing a record transport stream 96 from a transport stream 94 which is broadcast, via a transport stream 95 which is processed in the packet demultiplexing section 66.

Hereinafter, the operation of the transmission system 52 in Embodiment 2 will be described in detail.

A coding section 8 produces a packet stream consisting of packets 80 and 88 having contents of a program A, and a packet stream consisting of packets 81, 85, and 89 having contents of a program B, and outputs the packet streams to the packet multiplexing section 10.

The program selection relating data producing section 59 produces a packet stream consisting of a PAT packet 82, a PMT packet 87, an NIT packet 84, an SDT packet 86, and an EIT packet 83, and outputs the packet stream to the packet multiplexing section 10.

The packet multiplexing section 10 multiplexes the packet stream supplied from the coding section 8, and the packet stream supplied from the program selection relating data producing section 59, to produce the transport stream 94. The transport stream is then output to a channel coding section 11.

The channel coding section 11 performs addition of an error correcting code, an interleave process, and addition of a synchronizing signal on the transport stream supplied from the packet multiplexing section 10, and then outputs the transport stream to a modulating section 12.

The modulating section 12 modulates the transport stream supplied from the channel coding section 11, and transmits a radio wave 97.

A satellite transponder 6 receives the radio wave 97, and then transmits a radio wave 98.

Next, the operation of the reception system 53 in Embodiment 2 will be described in detail.

In response to external instructions, the reception system 53 selects the program A as a record program in Embodiment 2 to start the receiving operation. Specifically, the reception system 53 receives the radio wave 98 from the satellite transponder 6, and refers information in the PAT in the transport stream of the radio wave, to detect the PMT. The PID designating section 78 refers the SIT record interval data supplied from the program selection relating data producing section 59 to appropriately recognize the PID of the packet 85 having contents of the program B which is an unrecord program, and performs a signal output to the first replace PID storing device 67 and the second replace PID storing device 74. The PID designating section 78 performs also a signal output to the record PID storing device 18 and the NIT PID storing device 23.

The record PID storing device 18 receives the signal from the PID designating section 78, and stores the PIDs of the packets 80 and 88 having contents of the program A. The first replace PID storing device 67 receives the signal from the PID designating section 78, and appropriately stores the PID of the packet 85 having contents of the program B which is an unrecord program. The NIT PID storing device 23 receives the signal from the PID designating section 78, and stores the PID of the NIT packet 84. The second replace PID storing device 74 receives the signal from the PID designating section 78, and appropriately stores the PID of the packet 85 having contents of the program B.

As a result of the reference to the SIT record interval data, the PID designating section 78 does not designate the PIDs of the packets 81 an 89 having contents of the program B, as a replace PID. Therefore, the PIDs of the packets 81 an 89 having contents of the program B are not stored into the first replace PID storing device 67, and the PIDs of the packets 81 an 89 having contents of the program B are not stored into the second replace PID storing device 74.

The receiving section 13 receives the radio wave 98, and then outputs the radio wave to a demodulating section 14.

The demodulating section 14 outputs the transport stream which is obtained by demodulating the radio wave 98 received by the receiving section 13, to the channel decoding section 15.

The channel decoding section 15 performs error correction on the transport stream supplied from the demodulating section 14, restores the transport stream 94, and outputs the restored transport stream to the PID filter 69.

As described above, the record PID storing device 18 stores the PIDs of the packets 80 and 88 having contents of the program A. The first replace PID storing device 67 appropriately stores the PID of the packet 85 having contents of the program B which is an unrecord program, as a replace PID (the PIDs of the packets 81 an 89 having contents of the program B are not designated as a replace PID).

Therefore, the record PID storing device 18 can indicate the packets 80 and 88 having contents of the program A, to the PID filter 69. The first replace PID storing device 67 can indicate the packet 85 having contents of the program B, to the PID filter 69.

The PID filter 69 extracts the packets 80 and 88 having contents of the program A which are indicated by the record PID storing device 18, and the packet 85 having contents of the program B which is indicated by the first replace PID storing device 67, from the transport stream 94 output from the channel decoding section 65. Furthermore, the PID filter 69 extracts the PAT packet 82, the PMT packet 87, the NIT packet 84, the SDT packet 86, and the EIT packet 83 from the transport stream 94 output from the channel decoding section 15.

The PID filter 69 then outputs the SDT and the EIT to an SIT producing section 21. Furthermore, the PID filter 69 outputs to an output switching circuit 20 the transport stream 95 consisting of the packets 80 and 88 having contents of the program A, the packet 85 having contents of the program B, the PAT packet 82, the PMT packet 87, the NIT packet 84, the SDT packet 86, and the EIT packet 83.

The SIT producing section 21 receives the SDT and the EIT supplied from the PID filter 69, produces SIT packets 91 and 92, and outputs the SIT packets to the SIT storing device 25. The SIT storing device 25 outputs the SIT packets 91 and 92 supplied from the SIT producing section 21, to the SIT packet replacing device 76.

The output switching circuit 20 receives the transport stream 95 supplied from the PID filter 69.

If the output switching circuit 20 is set to the output for displaying, the output switching circuit 20 outputs the display transport stream to a decoding section 27. The decoding section 27 expands the display transport stream supplied from the output switching circuit 20, and outputs a signal of the expanded stream to the display device 4.

The display device 4 receives the signal output from the decoding section 27, and reproduces an image and a sound constituting the program A.

If the output switching circuit 20 is set to the output for recording, the output switching circuit 20 outputs the transport stream 95 to the SIT packet replacing device 76.

As described above, the NIT PID storing device 23 stores the PID of the NIT packet 84, and the second replace PID storing device 74 appropriately stores the PID of the packet 85 having contents of the program B.

The SIT packet replacing device 76 receives the transport stream 95 supplied from the output switching circuit 20. The SIT packet replacing device 76 replaces the NIT packet 84 indicated by the NIT PID storing device 23, with the SIT packet 91 supplied from the SIT storing device 25. Furthermore, the SIT packet replacing device 76 replaces the packet 85 having contents of the program B which is indicated by the second replace PID storing device 74, with the SIT packet 92 supplied from the SIT storing device 25.

In this way, the SIT packet replacing device 76 performs replacement of the NIT packet 84 with the SIT packet 91, and that of the packet 85 having contents of the program B with the SIT packet 92, and then outputs the signals to a packet modifying section 29.

The packet modifying section 29 receives the signals output from the SIT packet replacing device 76, and modifies the PAT packet 82 to a modified PAT packet 90, and the PMT packet 87 to a modified PAT packet 93. The packet modifying section 29 discards the SDT packet 86 and the EIT packet 83. In this way, the packet modifying section 29 produces a record transport stream 96, and outputs the stream to the recording device 5.

The recording device 5 receives the record transport stream 96 supplied from the packet modifying section 29, and records the transport stream.

In the invention, the replace PID is not required to be the whole of or a part of an unrecord PID as in Embodiment 2 described above, and may be the SDT PID, or the EIT PID.

The problem in that the transmission interval of an NIT packet as a replace packet is insufficient is solved by sending an SIT record interval data instructing an appropriate record interval for the SIT, and using a packet having contents of an unrecord program as a replace packet which is replaceable with an SIT packet.

Embodiment 3

Figure 7:
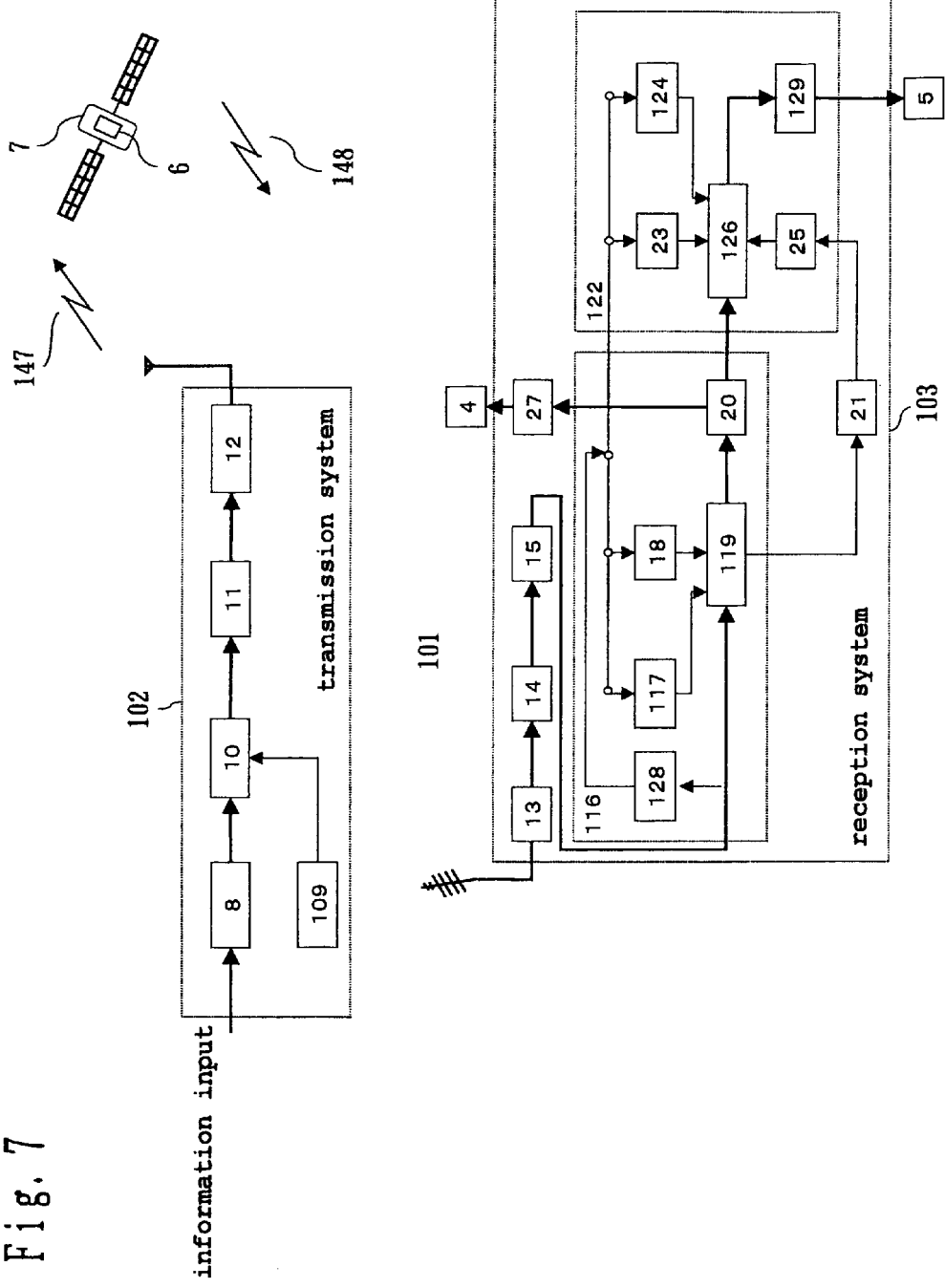
FIG. 7 is a diagram showing the configuration of a digital broadcasting system which is described in Embodiment 3 of the invention.

First, the configuration of a digital broadcasting system of Embodiment 3 will be described with reference to FIG. 7. FIG. 7 is a diagram showing the configuration of a digital broadcasting system 101 of Embodiment 3.

The digital broadcasting system 101 comprises a transmission system 102 which produces and transmits a transport stream, and a reception system 103 which receives the transport stream and outputs it to a display device 4 or a recording device 5.

The transmission system 102 in Embodiment 3 is identical with the transmission system described in the paragraph of the conventional art.

The configuration of the reception system 103 in Embodiment 3 will be described with reference to FIG. 7.

The reception system 103 has a packet demultiplexing section 116, a stream sending section 122, etc.

The packet demultiplexing section 116 has a PID filter 119, etc.

A PID designating section 128 can designate the PID of a packet having contents of an unrecord program (hereinafter, often referred to as unrecord PID), and the EIT PID (i.e., the PID of the EIT packet), to a first replace PID storing device 117 and a second replace PID storing device 124.

The first replace PID storing device 117 receives a signal from the PID designating section 128, and stores the unrecord PID and the EIT PID. The unrecord PID and the EIT PID stored in the first replace PID storing device 117 are identical with the unrecord PID and the EIT PID stored in the second replace PID storing device 124.

The PID filter 119 extracts a packet having contents of a record program which is indicated by a record PID storing device 18, a packet having contents of the unrecord program which is indicated by the first replace PID storing device 117, an EIT packet which is indicated by the first replace PID storing device 117, a packet having program specific information, and a packet having service information, from a transport stream which is supplied from a channel decoding section 15.

The stream sending section 122 has an SIT packet replacing device 126, etc.

The second replace PID storing device 124 receives a signal from the PID designating section 128, and stores the unrecord PID and the EIT PID. The unrecord PID and the EIT PID stored in the second replace PID storing device 124 are identical with the unrecord PID and the EIT PID stored in the first replace PID storing device 117.

The SIT packet replacing device 126 can replace an NIT packet which is indicated by an NIT PID storing device 23, the packet having contents of the unrecord program indicated by the second replace PID storing device 124, and an EIT packet which is indicated by the second replace PID storing device 124, with an SIT packet which is output from an SIT storing device 25.

The packet modifying section 129 receives the signals output from the SIT packet replacing device 126, and modifies the packet to produce a record transport stream.

Figure 8:
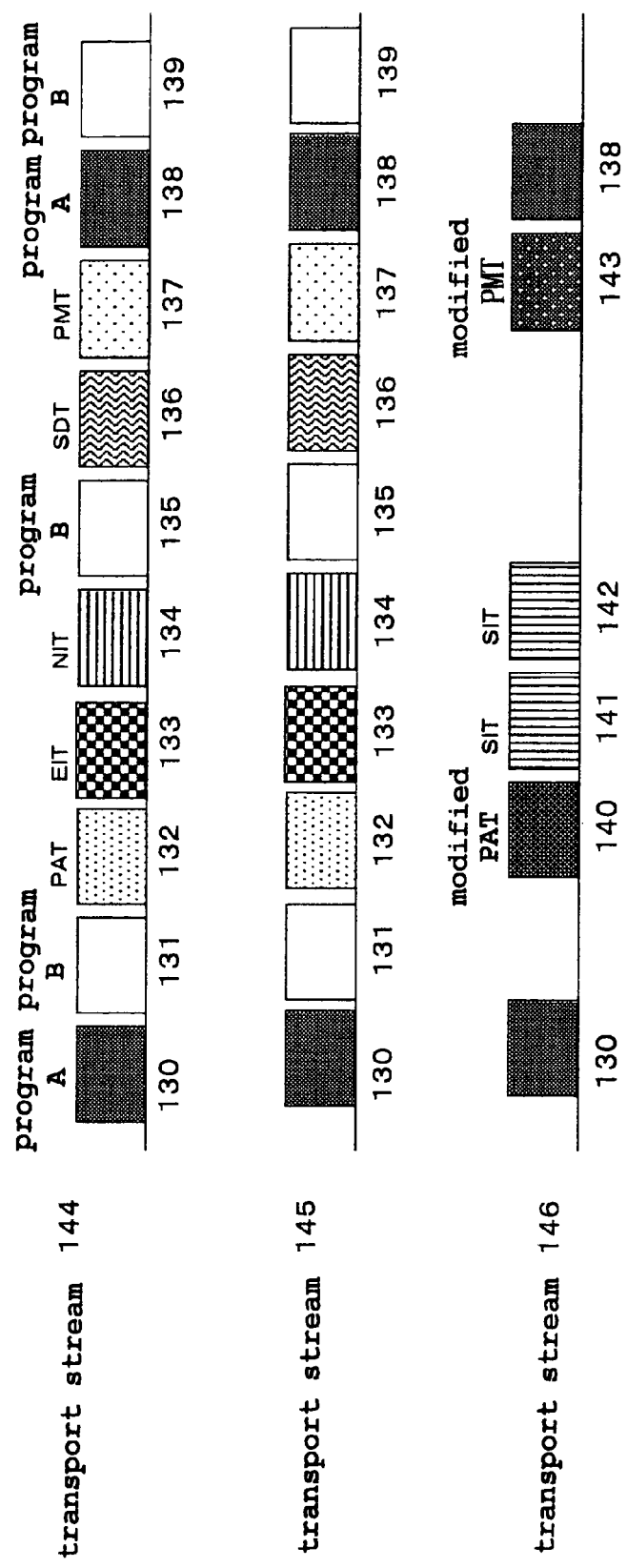
FIG. 8 is a conceptual diagram illustrating steps of producing a record transport stream which is described in embodiment 3 of the invention.
Figure 9:
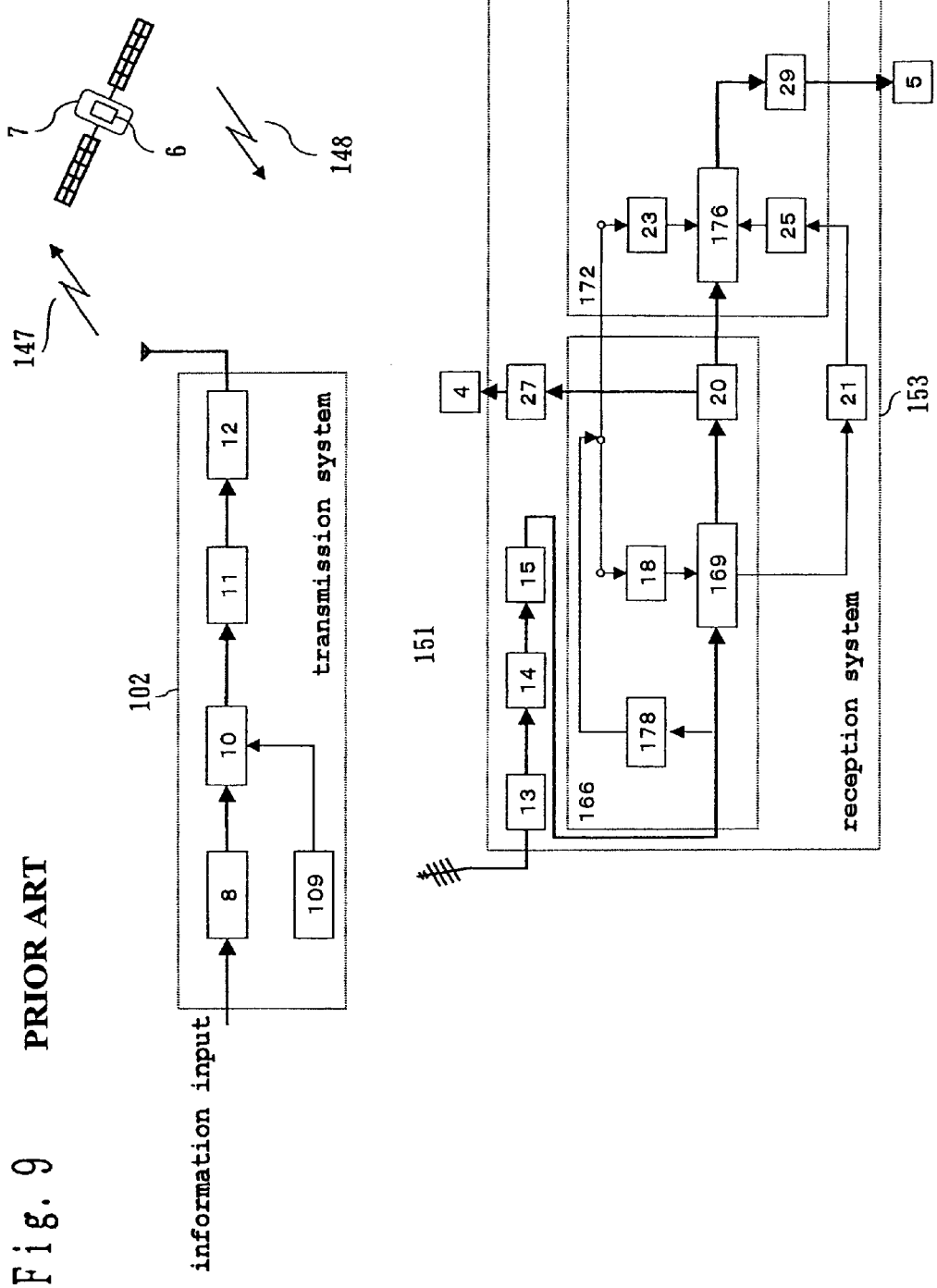
FIG. 9 is a diagram showing the configuration of a digital broadcasting system of the conventional art.
Figure 10:
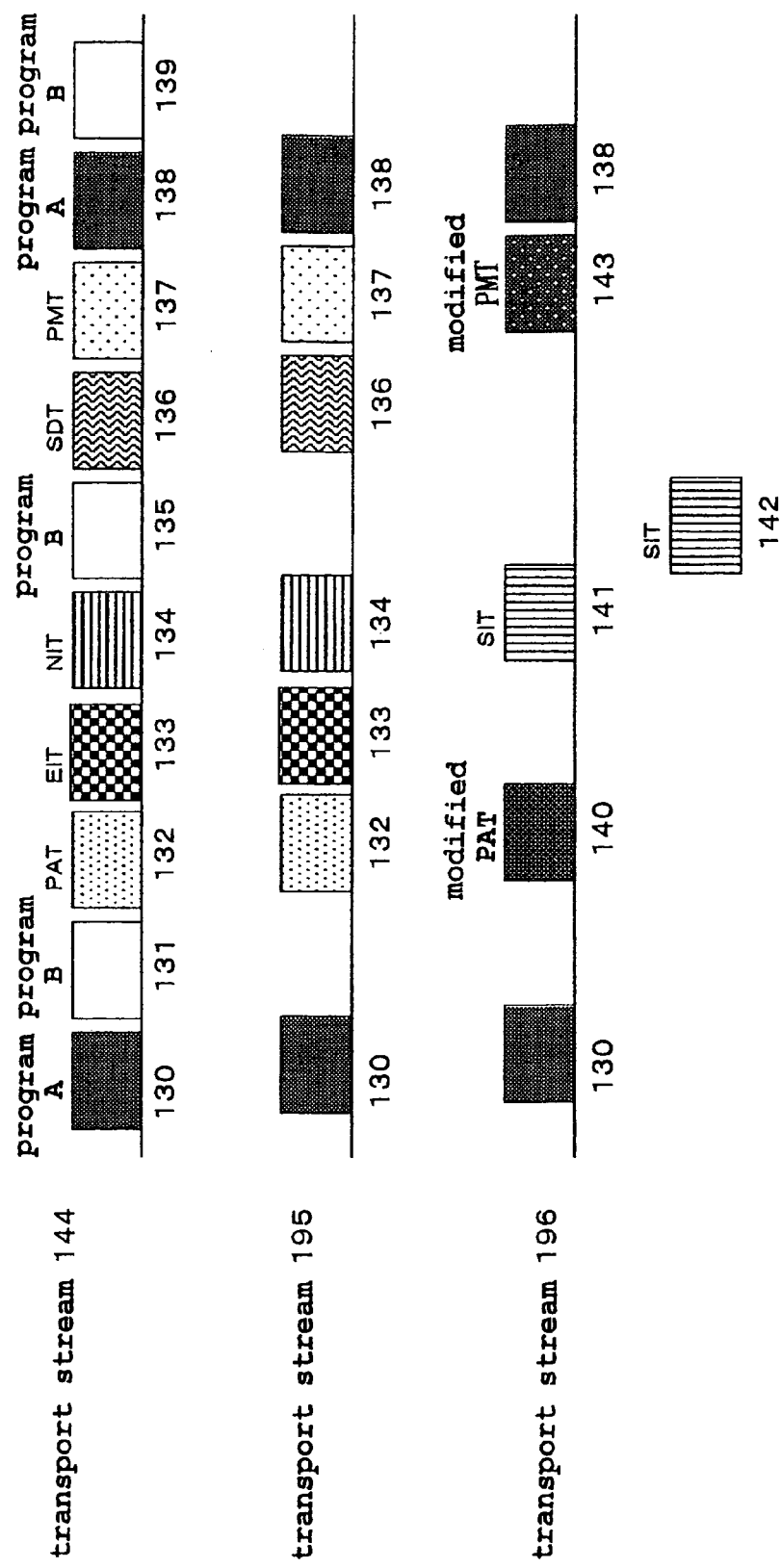
FIG. 10 is a conceptual diagram illustrating steps of producing a record transport stream in the conventional art.

The operation of the thus configured digital broadcasting system 101 of Embodiment 3 will be described with reference to FIG. 8 also. FIG. 8 is a conceptual diagram illustrating steps of producing a record transport stream 146 from a transport stream 144 which is broadcast, via a transport stream 145 which is processed in the packet demultiplexing section 116.

The transmission system 102 in Embodiment 3 operates in the same manner as the transmission system described in the paragraph of the conventional art.

The operation of the reception system 103 in Embodiment 3 will be described in detail.

In response to external instructions, the reception system 103 selects a program A as a record program in Embodiment 3 to start the receiving operation. Specifically, the reception system 103 receives the radio wave 148 from the satellite transponder 6, and refers information in the PAT in the transport stream of the radio wave, to detect the PMT. The PID designating section 128 recognizes the PIDs of the packets 131, 135, and 139 having contents of a program B which is an unrecord program, and the EIT packet 133, and performs a signal output to the first replace PID storing device 117 and the second replace PID storing device 124. The PID designating section 128 performs also a signal output to the record PID storing device 18 and the NIT PID storing device 23.

The record PID storing device 18 receives the signal from the PID designating section 128, and stores the PIDs of the packets 130 and 138 having contents of the program A. The first replace PID storing device 117 receives the signal from the PID designating section 128, and stores the PIDs of the packets 131, 135, and 139 having contents of the program B, and the PID of the EIT packet 133. The NIT PID storing device 23 receives the signal from the PID designating section 128, and stores the PID of the NIT packet 134. The second replace PID storing device 124 receives the signal from the PID designating section 128, and stores the PIDs of the packets 131, 135, and 139 having contents of the program B, and the PID of the EIT packet 133.

The receiving section 13 receives the radio wave 148, and then outputs the radio wave to a demodulating section 14.

The demodulating section 14 outputs the transport stream which is obtained by demodulating the radio wave 148 received by the receiving section 13, to the channel decoding section 15.

The channel decoding section 15 performs error correction on the transport stream supplied from the demodulating section 14, restores the transport stream 144, and outputs the restored transport stream to a PID filter 119.

The PID filter 119 extracts the packets 130 and 138 having contents of the program A which are indicated by the record PID storing device 18, the PIDs of the packets 131, 135, and 139 having contents of the program B which are indicated by the first replace PID storing device 117, and the EIT packet 133 which is indicated by the first replace PID storing device 117, from the transport stream 144 output from the channel decoding section 15. Furthermore, the PID filter 119 extracts the PAT packet 132, the PMT packet 137, the NIT packet 134, the SDT packet 136, and the EIT packet 133 from the transport stream 144 output from the channel decoding section 15.

The PID filter 119 then outputs the SDT and the EIT to an SIT producing section 21. Furthermore, the PID filter 119 outputs to the output switching circuit 20 the transport stream 145 consisting of the packets 130 and 138 having contents of the program A, the packets 131, 135, and 139 having contents of the program B, the PAT packet 132, the PMT packet 137, the NIT packet—134, the SDT packet 136, and the EIT packet 133.

The SIT producing section 21 receives the SDT and the EIT supplied from the PID filter 119, produces SIT packets 141 and 142, and outputs the SIT packets to the SIT storing device 25. The SIT storing device 25 outputs the SIT packets 141 and 142 supplied from the SIT producing section 21, to the SIT packet replacing device 126.

The output switching circuit 20 receives the transport stream 145 supplied from the PID filter 119.

If the output switching circuit 20 is set to the output for displaying, the output switching circuit 20 outputs the display transport stream to the decoding section 27.

The decoding section 27 expands the display transport stream supplied from the output switching circuit 20, and outputs a signal of the expanded stream to the display device 4.

The display device 4 receives the signal output from the decoding section 27, and displays an image and a sound constituting the program A.

If the output switching circuit 20 is set to the output for recording, the output switching circuit 20 outputs the transport stream 145 to the SIT packet replacing device 126.

The SIT packet replacing device 126 receives the transport stream 145 supplied from the output switching circuit 20. The SIT packet replacing device 126 determines whether the NIT packet 134, the packets 131, 135, and 139 having contents of the program B, and the EIT packet 133 are actually replaced with the SIT packets 141 and 142 or not.

Specifically, the SIT packet replacing device 126 replaces the NIT packet 134 indicated by the NIT PID storing device 23, with the SIT packet 141 supplied from the SIT storing device 25. The SIT packet replacing device 126 replaces the EIT packet 133 indicated by the second replace PID storing device 124, with the SIT packet 142 supplied from the SIT storing device 25. The SIT packet replacing device 126 does not replace the packets 131, 135, and 139 having contents of the program B with the SIT packet (as described above, the transmission interval of the EIT packet is sufficient, and hence a packet having contents of an unrecord program is not sometimes used as a replace packet).

In this way, the SIT packet replacing device 126 performs replacement of the NIT packet 134 with the SIT packet 142, and that of the EIT packet 133 with the SIT packet 141, and then outputs the signals to the packet modifying section 129.

The packet modifying section 129 receives the signals output from the SIT packet replacing device 126, and modifies the PAT packet 132 to a modified PAT packet 140, and the PMT packet 137 to a modified PAT packet 143. The packet modifying section 129 discards the SDT packet 136, the EIT packet 133, and the packets 131, 135, and 139 having contents of the program B. In this way, the packet modifying section 129 produces a record transport stream 146, and outputs the stream to the recording device 5.

The recording device 5 receives the record transport stream 146 supplied from the packet modifying section 129, and records the transport stream.

In the invention, the SIT packet replacing device 126 is not required to replace properly replace packets which are adequately selected from a packet having a designated replace PID with SIT packets as in Embodiment 3 described above. Alternatively, replace packets which are selected at a predetermined ratio from all packets having a designated replace PID may be replaced with SIT packets.

As described above, the problem in that the transmission interval of an NIT packet as a replace packet is insufficient is solved by providing the SIT packet replacing device with an ability of determining whether replacement with an SIT packet is actually performed or not, and using a packet having contents of an unrecord program, and an EIT packet as a replace packet which is replaceable with an SIT packet.

In the embodiments described above, a member in which the PID filter and the SIT packet replacing device are combined with each other corresponds to the packet extracting and replacing section of the invention.

In the invention, a packet stream is not required to be configured by ten packets as in the embodiments described above, and may be configured by any number of packets.

In the invention, it is not required that only two programs are broadcasting as in the embodiments described above, and any number of programs may be broadcast.

In the invention, it is not required to use two replace-PID storing devices as in the embodiments described above, and only one replace PID storing device may be used.

In the invention, the digital broadcasting is not required to broadcasting which uses a communication satellite as in the embodiments described above, and may be cable broadcasting which uses an optical fiber or a coaxial cable, or radio broadcasting.

In the invention, the digital broadcasting is not required to broadcasting of programs as in the embodiments described above, and may be broadcasting of computer games or karaoke.

As apparent from the above description, a reception system in which a replace packet that is replaceable with an SIT packet can be provided.

A a reception system in which, in addition to the above-mentioned effect, replace packets for programs can be provided.

A a reception system in which, in addition to the above-mentioned effect, a replace packet can be ensured in response to instructions from a transmission system.

A a reception system in which, in addition to the above-mentioned C effects, replace packets can be sufficiently provided in response to instructions from a transmission system.

A a reception system in which, in addition to the above-mentioned effect, a replace packet can be provided in accordance with a judgment of the reception system without the participation of a transmission system.

A a digital broadcasting system in which replace packets for programs can be certainly provided.

A a program recording medium which enables replace packets for programs to be certainly provided.

What is claimed is:

1. A reception system, comprising:
a receiving unit which is configured to receive a transport stream transmitted from a transmission system that produces and transmits the transport stream, the transport stream being produced by multiplexing compression coded contents of a program, and electronic program guide information including program specific information having at least an NIT, a PAT, and a PMT, and service information having at least an EIT, the transport stream comprising an NIT packet having the NIT;
a PID designating unit which is configured to designate a PID of a packet other than the NIT packet in the electronic program guide information, as a replace packet;
an SIT producing unit which is configured to produce first and second SIT packet from the service information in the received transport stream; and
a packet extracting and replacing unit which is configured to replace the NIT packet with the first SIT packet and to replace the replace packet designated by the PID designating unit with the SIT packet.

2. A reception system according to claim 1, wherein the transmission system produces a dummy packet for replacement, and inserts the dummy packet into the transport stream, and
the PID designating unit designates a PID of the dummy packet; and
the packet extracting and replacing unit replaces the NIT packet the replace packet and the dummy packet designated by the PID designating unit with the SIT packet.

3. A reception system according to claim 1, wherein the transmission system produces interval information of the SIT packets, and transmits the interval information of the SIT packets with the electronic program guide information,
the PID designating unit designates the PID of the replace packet with reference to the interval information of the SIT packets, and
the packet extracting and replacing unit replaces the NIT packet with the first SIT packet and replaces the replace packet designated by the PID designating unit with the second SIT packet.

4. A reception system according to claim 1, wherein
the PID designating unit designates the PID of a packet having contents of an unrecord program as an unrecord packet,
the packet extracting and replacing unit includes a PID filter and an SIT packet replacing device, and the PID filter is configured to extract a packet having the designated PID and contents of an unrecord program, and
the SIT packet replacing device replaces the NIT packet with the first SIT packet and replaces the replace packet and the unrecord packet designated by the PID designating unit with the second SIT packet.

5. A reception system according to claim 4, wherein
the PID designating unit designates a PID of a packet having contents of an unrecord program or an EIT, and
the packet extracting and replacing unit selects the replace packet from packets having the designated PID with reference to given interval information of the SIT packet, and replaces the selected packet with the second SIT packet.

6. A reception system, comprising:
a receiving unit which is configured to receive a transport stream transmitted from a transmission system that produces and transmits the transport stream, the transport stream being produced by multiplexing compression coded contents of a program, and electronic program guide information including program specific information having at least an NIT, a PAT, and a PMT, and service information having at least an EIT, the transport stream comprising an NIT packet having the NIT;
a PID designating unit which is configured to designate a PID of a packet other than the NIT packet in the electronic program guide information, as a replace packet;
a replace PID storing unit which is configured to store the replace PID;
an SIT producing unit which is configured to produce first and second SIT packets from the service information in the received transport stream; and
a packet extracting and replacing unit which is configured to replace the NIT packet with thee first SIT packet and to replace a replace packet indicated by the replace PID storing unit with second the SIT packet.

7. A reception system according to any one of claims 1 to 6, wherein the service information also has an SDT.

8. In a communications system receiving a multiplexed transport stream including first and second programs, program specific information including a network information table (NIT), and service information, a method for recording the first program comprising the steps of:
(a) identifying a respective packet identifier (PID) for each of the first program, a packet of the second program, and the NIT;
(b) storing the PID of the packet of the second program in a replacement store;
(c) storing the PID for the first program and the PID for the NIT;
(d) extracting the first program, the packet of the second program, and the NIT in response to step (a);
(e) producing a selection information table (SIT) from the service information;
(f) replacing the NIT with the SIT using the PID stored in step (c);
(g) replacing the packet of the second program with the SIT using the PID for the packet of the second program stored in step (b); and
(h) recording the first program including the SITs from steps (f) and (g).

9. In a communications system receiving a multiplexed transport stream including a program, a dummy program, program specific information including a network information table (NIT), and service information, a method for recording the program comprising the steps of:
(a) identifying a respective packet identifier (PID) for each of the program, the dummy program, and the NIT;
(b) storing the PID of the dummy program in a replacement store;
(c) storing the PID for the program and the PID for the NIT;
(d) extracting the program, the dummy program, and the NIT in response to step (a);
(e) producing a selection information table (SIT) from the service information;
(f) replacing the NIT with the SIT using the PID stored in step (c);
(g) replacing the dummy program with the SIT using the PID for the dummy program stored in step (b); and
(h) recording the program including the SITs from steps (f) and (g).

10. A reception system, comprising:
a receiving unit which is configured to receive a transport stream transmitted from a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising an EIT packet having the EIT;
an SIT producing unit which is configured to produce an SIT packet from the service information in the received transport stream; and
a packet replacing unit which is configured to replace at least the EIT packet with the SIT packet.

11. A reception system according to claim 10, wherein the transport stream modified by the packet replacing unit is outputted as a recording-use transport stream to the outside.

12. A reception system according to claim 10, wherein the packet replacing unit is further configured to replace an NIT packet in the transport stream having the NIT with another SIT packet produced by the SIT producing unit.

13. A digital broadcast system, comprising:
a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising an EIT packet having the EIT; and
a reception system comprising:
a receiving unit which is configured to receive the transmitted transport stream;
an SIT producing unit which is configured to produce an SIT packet from the service information in the received transport stream; and
a packet replacement unit which is configured to replace at least the EIT packet with the SIT packet.

14. A reception method, comprising:
a receiving step of receiving a transport stream transmitted from a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising an EIT packet having the EIT;
an SIT producing step of producing an SIT packet from the service information in the received transport stream; and
a packet replacing step of replacing at least the EIT packet with the SIT packet.

15. A reception system, comprising:
a receiving unit which is configured to receive a transport stream transmitted from a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising an NIT packet having the NIT;
- a PID designating unit which is configured to selectively designate a PID of a packet of a predetermined type, which is other than the NIT packet in the received transport stream, as a PID of a replace packet;
- a replace PID storing unit which is configured to store the selectively designated PID of the replace packet;
- an SIT producing unit which is configured to produce first and second SIT packets from the service information in the received transport stream; and
- a packet replacing unit which is configured to replace all or part of the replace packet, the PID of which has been stored, with the first SIT packet and to replace all or part of the NIT packet with the second SIT packet.

16. A reception system according to claim 15, wherein:
the transport stream modified by the packet replacing unit is outputted as a recording-use transport stream to the outside; and
the packet of the predetermined type in the received transport stream is not included in the recording-use transport stream.

17. A reception system according to claim 16, wherein all or part of the packet of the predetermined type in the received transport stream is a packet which contains contents of a program not to be recorded, among the compression coded contents of a program.

18. A reception system according to any one of claims 15 to 17, wherein the replacing and/or the selective designation are carried out on the basis of interval information which is transmitted as an attachment to the electronic program guide information from the transmission system, and which specifies an interval in which the replacing and/or the selective designation is to be carried out.

19. A reception system according to any one of claims 15 to 17, wherein the replacing and/or the selective designation are carried out on the basis of an interval in which the replacing and/or the selective designation is to be carried out and which is set according to a predetermined criterion.

20. A digital broadcast system, comprising:
- a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising an NIT packet having the NIT; and
- a reception system comprising:
  - a receiving unit which is configured to receive the transmitted transport stream;
  - a PID designating unit which is configured to selectively designate a PID of a packet of a predetermined type, which is other than the NIT packet in the received transport stream, as a PID of a replace packet;
  - a replace PID storing unit which is configured to store the selectively designated PID of the replace packet;
  - an SIT producing unit which is configured to produce first and second SIT packets from the service information in the received transport stream; and
  - a packet replacing unit which is configured to replace all or part of the replace packet, the PID of which has been stored, with the first SIT packet and to replace all or part of the NIT packet with the second SIT packet.

21. A transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising at least an NIT packet having the NIT, wherein:
- the transmitted transport stream is received;
- a PID of a packet of a predetermined type which is other than the NIT packet in the received transport stream is selectively designated as a PID of a replace packet;
- the selectively designated PID of the replace packet is stored;
- an SIT packet is produced from the service information in the received transport stream;
- all or part of the replace packet, the PID of which has been stored, is replaced with the SIT packet;
- transmitted from the transmission system is interval information which is transmitted as an attachment to the electronic program guide information from the transmission system, and which specifies an interval in which the replacing and/or the selective designation is to be carried out; and
- the replacing and/or the selective designation are carried out on the basis of the interval information.

22. A reception method, comprising:
- a receiving step of receiving a transport stream transmitted from a transmission system which multiplexes at least (1) compression coded contents of a program and (2) electronic program guide information containing at least program specific information having at least an NIT, a PAT, and a PMT and service information having at least an EIT, and thereby produces and transmits a transport stream comprising at least an NIT packet having the NIT;
- a PID designating step of selectively designating a PID of a packet of a predetermined type, which is other than the NIT packet in the received transport stream, as a PID of a replace packet;
- a replace PID storing step of storing the selectively designated PID of the replace packet;
- an SIT producing step of producing an SIT packet from the service information in the received transport stream; and
- a packet replacing step of replacing all or part of the replace packet, the PID of which has been stored, with the SIT packet.

23. A reception system, comprising:
- a receiving unit which is configured to receive a transport stream transmitted from a transmission system which multiplexes at least (1) compression coded contents of a program, (2) program specific information having at least a PAT and a PMT, and (3) service information having at least an EIT; and
- a replacing unit which is configured to replace a packet having the EIT with a SIT packet generated from the service information in the received transport stream.

24. A reception system, comprising:
- a receiving unit which is configured to receive a transport stream transmitted from a transmission system which multiplexes at least (1) compression coded contents of a program, (2) program specific information having at least a PAT and a PMT, and (3) service information having at least an EIT; and
- a replacing unit which is configured to replace a packet having the EIT with a packet having a selection information table generated from the service information in the received transport stream.

25. A reception system according to claims 23 or 24, further comprising:
   a designating unit which is configured to designate a PID of a packet having the EIT; and
   a replacing unit which is configured to replace a packet having the EIT which is designated by the designating unit.

26. A reception system according to claims 23 or 24, wherein the service information also has an SDT.

27. A reception system according to claims 23 or 24, wherein the packet having a selection information table relates to a program which is selected by an external instruction.

28. A reception system according to claims 23 or 24, wherein the replacing unit replaces the packet having the EIT on the basis of an interval which is set according to a predetermined criterion.

* * * * *

UNITED STATES PATENT AND TRADEMARK OFFICE
CERTIFICATE OF CORRECTION

| | | |
|---|---|---|
| PATENT NO. | : 7,193,999 B1 | Page 1 of 2 |
| APPLICATION NO. | : 09/662432 | |
| DATED | : March 20, 2007 | |
| INVENTOR(S) | : Masahiro Takatori et al. | |

It is certified that error appears in the above-identified patent and that said Letters Patent is hereby corrected as shown below:

Column 20
Line 14, after "packet" add -- , --

Column 20
Line 18, change "packet" to -- packets --

Column 20
Line 23, after "the" add -- second --

Column 20
Line 31, after "packet" and before "the"
add -- with the first SIT packet and replaces --

Column 20
Line 32, after "the" and before "SIT"
add -- second --

Column 20
Line 58, change "4" to -- 3 --

Column 20
Line 64, change "packet" to -- packets --

Column 21
Line 13, after "packet" and before "other" add -- , --

Column 21
Line 22, change "thee" to -- the--

Column 21
Line 24, after "with" add -- the --

UNITED STATES PATENT AND TRADEMARK OFFICE
CERTIFICATE OF CORRECTION

| | |
|---|---|
| PATENT NO. | : 7,193,999 B1 |
| APPLICATION NO. | : 09/662432 |
| DATED | : March 20, 2007 |
| INVENTOR(S) | : Masahiro Takatori et al. |

It is certified that error appears in the above-identified patent and that said Letters Patent is hereby corrected as shown below:

<u>Column 21</u>
Line 24, after "second" delete "the"

Signed and Sealed this

Twenty-first Day of August, 2007

JON W. DUDAS
*Director of the United States Patent and Trademark Office*